(12) United States Patent
Bergum

(10) Patent No.: US 10,996,126 B2
(45) Date of Patent: May 4, 2021

(54) PRESSURE TRANSDUCER ASSEMBLY WITH ATMOSPHERIC REFERENCE

(71) Applicant: S.J. Electro Systems, Inc., Detroit Lakes, MN (US)

(72) Inventor: Alan J. Bergum, Detroit Lakes, MN (US)

(73) Assignee: S.J. Electro Systems, Inc., Detroit Lakes, MN (US)

( * ) Notice: Subject to any disclaimer, the term of this patent is extended or adjusted under 35 U.S.C. 154(b) by 0 days.

(21) Appl. No.: 16/579,149

(22) Filed: Sep. 23, 2019

(65) Prior Publication Data

US 2020/0103299 A1 Apr. 2, 2020

Related U.S. Application Data

(60) Provisional application No. 62/739,460, filed on Oct. 1, 2018.

(51) Int. Cl.
| | | |
|---|---|---|
| *G01L 13/00* | (2006.01) | |
| *G01L 19/00* | (2006.01) | |
| *G01F 23/14* | (2006.01) | |
| *G01F 23/18* | (2006.01) | |

(52) U.S. Cl.
CPC .......... *G01L 19/0084* (2013.01); *G01L 13/00* (2013.01); *G01F 23/14* (2013.01); *G01F 23/18* (2013.01)

(58) Field of Classification Search
CPC ..... G01L 13/00; G01L 19/0084; G01F 23/14; G01F 23/18; G01F 23/70
See application file for complete search history.

(56) References Cited

U.S. PATENT DOCUMENTS

| | | | | | |
|---|---|---|---|---|---|
| 2,718,145 | A | * | 9/1955 | Nisle ..................... | G01L 9/0035 73/301 |
| 3,153,342 | A | * | 10/1964 | Pierce .................... | G01F 23/18 73/301 |
| 3,393,565 | A | * | 7/1968 | Klee ......................... | G01F 1/50 73/704 |
| 3,862,646 | A | * | 1/1975 | Tarsha ..................... | G01L 7/02 138/104 |
| 4,227,410 | A | * | 10/1980 | Ruben .................... | G01F 23/18 338/42 |
| 4,335,608 | A | * | 6/1982 | Wood ..................... | G01F 23/18 174/19 |

(Continued)

*Primary Examiner* — David J Bolduc
(74) *Attorney, Agent, or Firm* — Dicke, Billig & Czaja, PLLC

(57) ABSTRACT

A pressure transducer assembly comprises a pressure transducer, a cable, an expandable member, and a vented connector. The cable includes a proximal end, a distal end, and a vent tube. The proximal end is operatively connected to the pressure transducer. The expandable member is operatively connected to the vent tube proximate the distal end. The vented connector is operatively connected to the distal end, and the vented connector is configured and arranged to allow exposure of the vent tube to atmospheric conditions when in a disconnected configuration and to prevent exposure of the vent tube to atmospheric conditions when in a connected configuration. The expandable member accommodates changes in air pressure within the vent tube when the vented connector is in the connected configuration.

14 Claims, 14 Drawing Sheets

(56) References Cited

U.S. PATENT DOCUMENTS

| | | | | |
|---|---|---|---|---|
| 4,491,016 A * | 1/1985 | Haefner | ............... | G01F 23/14 |
| | | | | 137/403 |
| 4,630,478 A * | 12/1986 | Johnson | ............... | G01F 23/14 |
| | | | | 73/299 |
| 4,843,883 A * | 7/1989 | Glover | ............... | G01F 23/18 |
| | | | | 73/301 |
| 5,097,841 A * | 3/1992 | Moriuchi | ............ | A61B 5/0215 |
| | | | | 600/488 |
| 5,213,159 A * | 5/1993 | Schneider | ........... | E21B 43/121 |
| | | | | 166/250.07 |
| 5,419,182 A * | 5/1995 | Koshimizu | ........ | G01L 19/0038 |
| | | | | 73/46 |
| 5,661,228 A * | 8/1997 | Young | ............... | G01F 23/14 |
| | | | | 73/299 |
| 2017/0322099 A1* | 11/2017 | Pol | ............... | H05K 5/0213 |
| 2018/0100778 A1* | 4/2018 | Gross | ............... | G01L 19/0627 |
| 2019/0353545 A1* | 11/2019 | Keeter | ............... | B32B 1/08 |

* cited by examiner

DETAIL B

DETAIL A

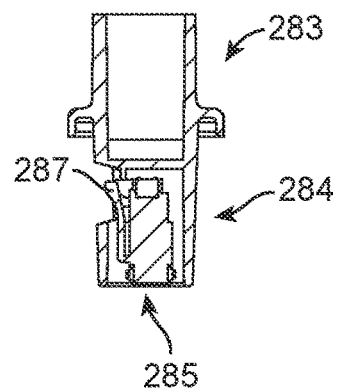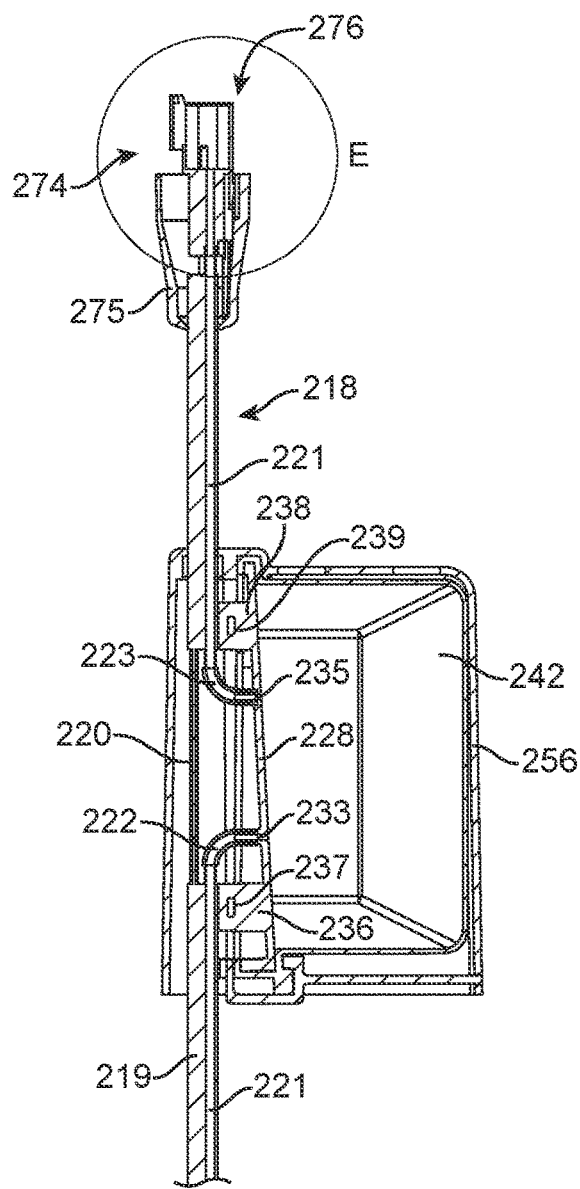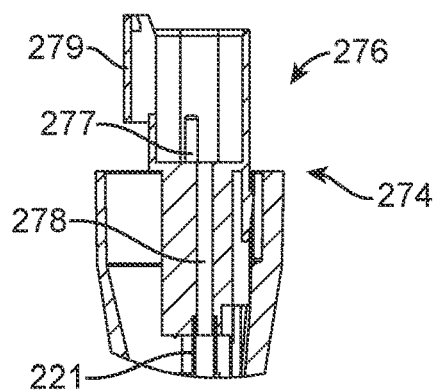
FIG. 6B
DETAIL E
FIG. 7

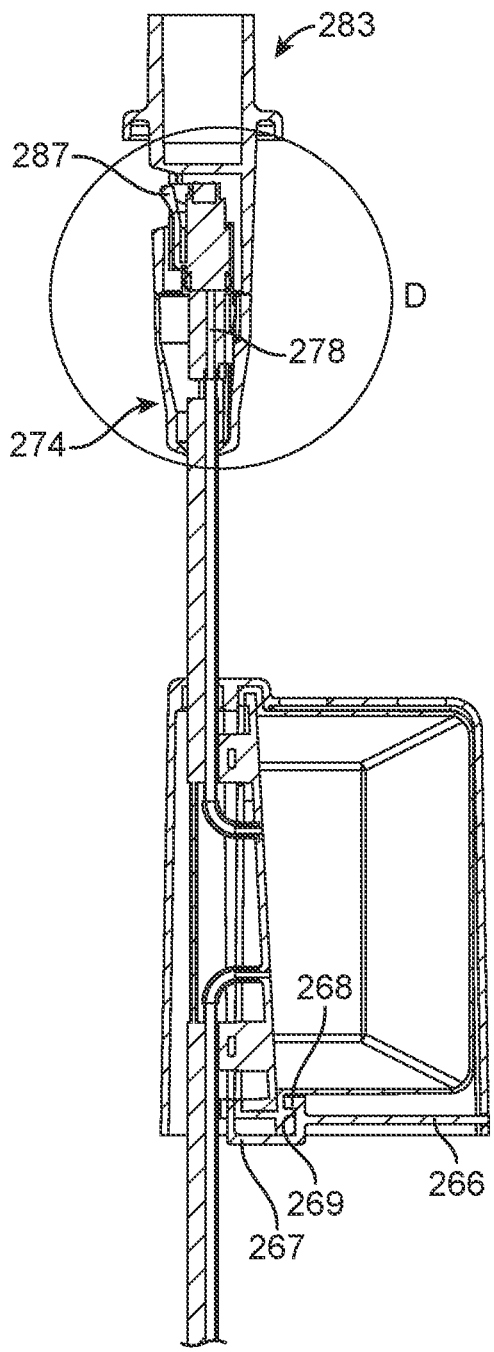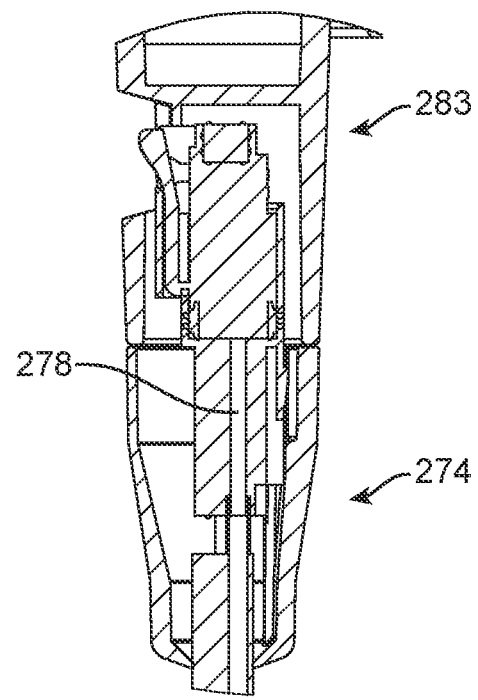
FIG. 8B
DETAIL D
FIG. 9

PRESSURE TRANSDUCER ASSEMBLY WITH ATMOSPHERIC REFERENCE

CROSS-REFERENCE TO RELATED APPLICATIONS

This application claims the benefit of U.S. Provisional Application Ser. No. 62/739,460, filed Oct. 1, 2018, which is incorporated in its entirety herein by reference.

BACKGROUND

A variety of water related environments (e.g., a septic tank) commonly utilize floats and pumps to control fluid levels within pump chambers. If the fluid level is too high, fluid will be discharged through a pump outlet. To assist in calculating fluid depth, a pressure transducer is also commonly used. A submersible pressure transducer is positioned within the fluid in the pump chamber and utilizes a vent tube, which is typically part of the transducer cable.

An example prior art pressure transducer 114 with a vent tube 121 is illustrated in FIGS. 1 and 2. The pressure transducer 114 is positioned within a pump chamber 100, in which there is also a pump 101 including a pump outlet 102 to discharge fluid from the pump chamber 100. A low level float 109 and a high level float 110 could also be positioned within the pump chamber 100. The vent tube 121 is part of the transducer cable 118, which also includes electrical wires (not shown) protected by a sleeve 119. The vent tube 121 is needed so that the reference side 115 of the transducer 114 can reference atmospheric pressure above the fluid in the pump chamber 100 while the pressure side 116 is measuring the pressure created by the fluid. This pressure differential along with the density of the fluid allows for the calculation of the fluid depth. These types of vent tubes are inherent to many issues including insects plugging the tube and condensate forming in the tube which can cause an inaccurate pressure differential. The condensate can also freeze causing the tube to be completely plugged which results in the loss of the atmospheric pressure reference. To combat this, users will place a bladder, bellow, or other expandable member 126 on the end of the vent tube 121, commonly within the control panel 106. The expandable member 126 seals the tube 121 yet still allows for the air in the tube 121 to expand and contract and still reference atmospheric pressure.

However, this is still problematic because these must be installed correctly. If too much or too little air is left in the expandable member, it can cause issues with the reading. Many times, when an expandable member is being installed, the user accidently presses on the expandable member causing this same issue. When long cable runs are needed, expandable members can also be problematic because the volume of air in the vent tube is proportional to the length of the vent tube and, in these systems, there is more air within the vent tube. Thus, the longer the vent tube, the more air that will be trapped by the expandable member. With a larger air volume, a larger expandable member is needed. Many times, this is overlooked, and the same expandable member is used which then fails because it reaches its maximum or minimum expandable limit. With the vent tube being brought back to the control cabinet, the expandable members are usually located within the cabinet. The cabinet is located where it is exposed to large temperature and pressure swings. It will see high temperature in the summer and low temperatures in the winter. This must be accounted for when sizing the correct size of expandable member. This is often not done correctly and will cause significant error in differential pressure value. With the vented cable being routed to the control panel, there is ample opportunity for the tube to get pinched or kinked when exiting the tank or going into the control box. These blockages of the vent tube can cause significant errors in the differential pressure reading of the transducer. These problems demonstrate a need for a submersible pressure transducer with an alternate way of connecting and sealing the reference side of the transducer.

For the reasons stated above and for other reasons stated below, which will become apparent to those skilled in the art upon reading and understanding the present specification, a need exists for the present invention.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

A pressure transducer assembly comprises a pressure transducer, a cable, an expandable member, and a vented connector. The cable includes a proximal end, a distal end, and a vent tube. The proximal end is operatively connected to the pressure transducer. The expandable member is operatively connected to the vent tube proximate the distal end. The vented connector is operatively connected to the distal end, and the vented connector is configured and arranged to allow exposure of the vent tube to atmospheric conditions when in a disconnected configuration and to prevent exposure of the vent tube to atmospheric conditions when in a connected configuration. The expandable member accommodates changes in air pressure within the vent tube when the vented connector is in the connected configuration.

A method for assembling a pressure transducer assembly comprising providing a pressure transducer; providing a cable including a proximal end, a distal end, and a vent tube; providing an expandable member including a vent tube connector and an expandable portion, the vent tube connector including a first portion connector with a first bore and a second portion connector with a second bore, the expandable portion having a cavity in fluid communication with the first and second bores; providing a vented connector; connecting the proximal end to the pressure transducer; separating the vent tube into a first portion and a second portion proximate the distal end; connecting the first portion to the first portion connector and the second portion to the second portion connector, the vent tube being in fluid communication with the expandable portion; and connecting the distal end of the cable to the vented connector, the vented connector configured and arranged to allow exposure of the vent tube to atmospheric conditions when in a disconnected configuration and to prevent exposure of the vent tube to atmospheric conditions when in a connected configuration, wherein the expandable member accommodates changes in air pressure within the vent tube when the vented connector is in the connected configuration.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

FIG. 6B is a cross-section view of the cable interconnecting the expandable member and the vented connector taken along the lines 6B-6B in FIG. 6A;

FIG. 7 is a detail view of the vented connector shown in FIG. 6;

FIG. 8B is a cross-section view of the cable interconnecting the expandable member and the vented connector, which is connected to a manifold connector taken along the lines 8B-8B in FIG. 8A;

FIG. 9 is a detail view of the vented connector shown in FIG. 8B;

DETAILED DESCRIPTION

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Embodiments of the disclosure generally provide a pressure transducer assembly including a built-in expandable member that is designed to be located in the pump chamber. This expandable member is in-line with the vent tube and uses a vented connector that is left open to atmospheric conditions (e.g., temperature, pressure, etc.) until the transducer is electrically connected. When the vented connector is mated, the vent tube is closed off and the expandable member then expands and contracts to accommodate any changes in the trapped air volume, for example with changes in atmospheric conditions. Because the vent tube is incorporated into the expandable member and the vented connector, this ensures the installation is done properly. In addition, because the expandable member is located in the pump chamber and the cable from the vented connector to the control panel does not need to be vented, the length of the vent tube can be controlled more easily and be much shorter than prior art systems. With the expandable member in the pump chamber, it is also not exposed to significant changes in atmospheric conditions such as large temperature swings and pressure changes to which the control panel is subjected. This reduces the amount of expansion and contraction of the trapped air. Further, installation of the expandable member is done in the factory to aid in proper installation. The use of a vented connector allows the installer to easily ensure the vent tube is properly installed. The installer simply plugs the vented connector into a manifold and the transducer, including its expandable member, is installed properly.

Figure 1:
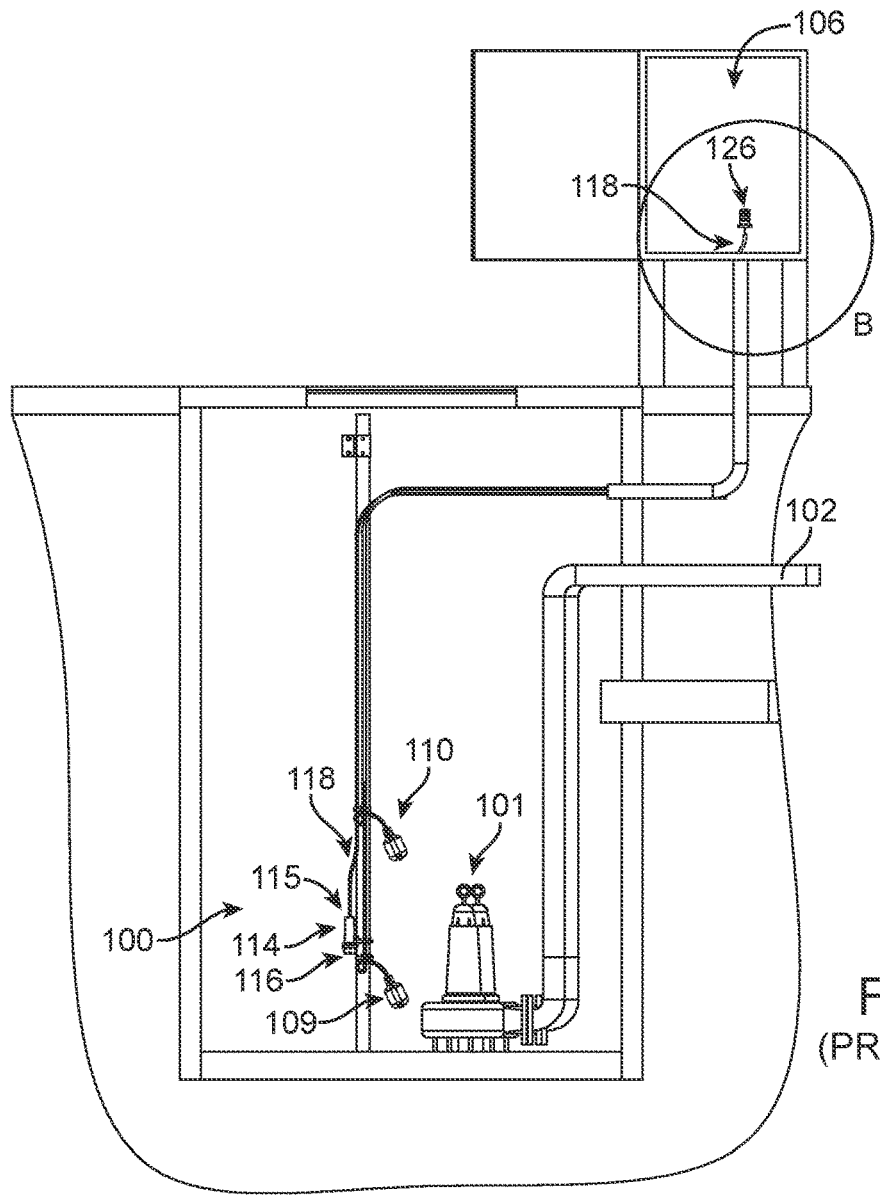
FIG. 1 is a prior art fluid pump system including a pressure transducer with a bladder.
Figure 2:
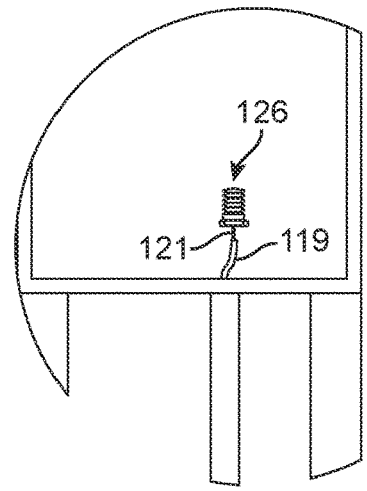
FIG. 2 is a detail view of the bladder shown in FIG. 1.
Figure 3:
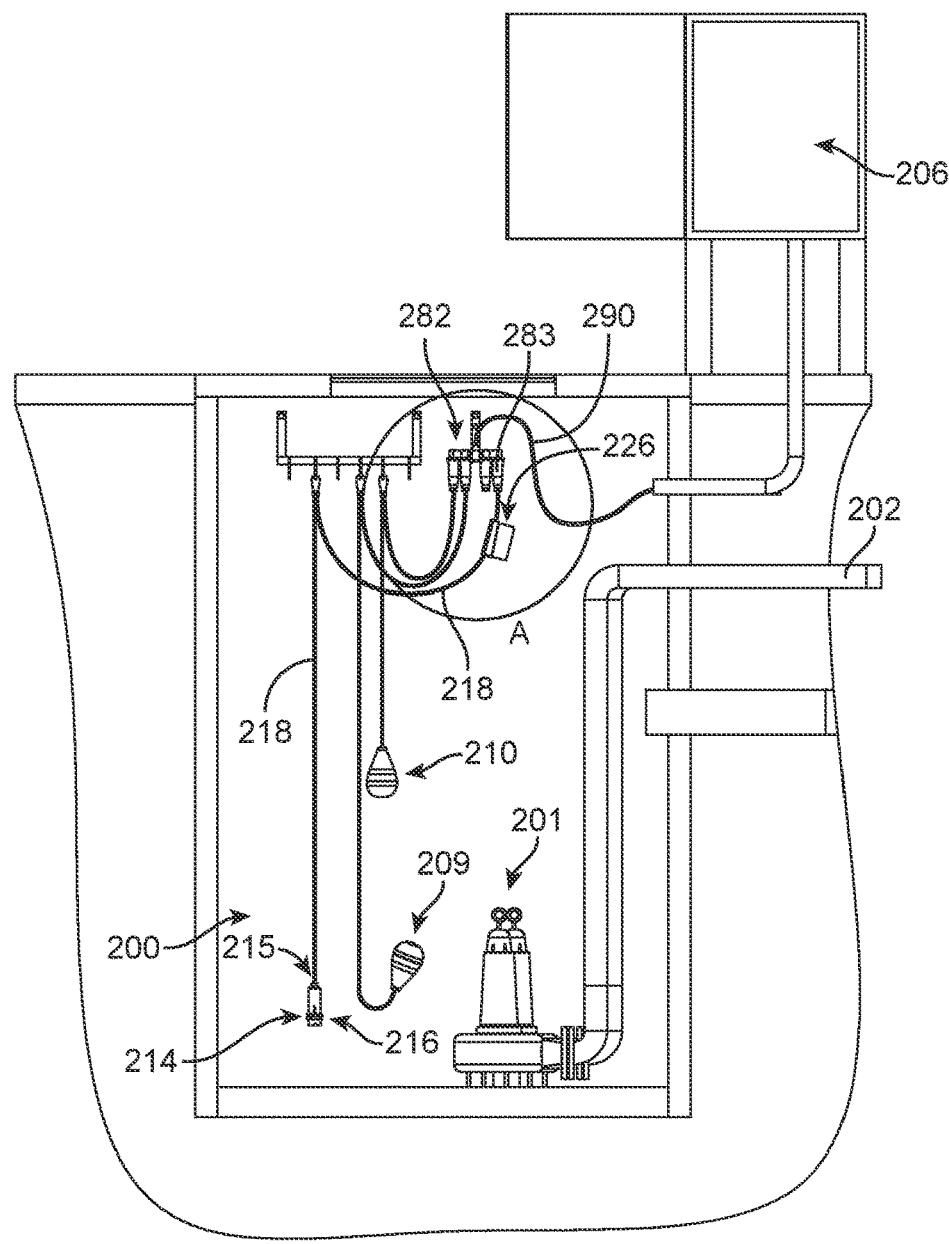
FIG. 3 is a fluid pump system including a pressure transducer with an expandable member constructed in accordance with the principles of the present invention.
Figure 4:
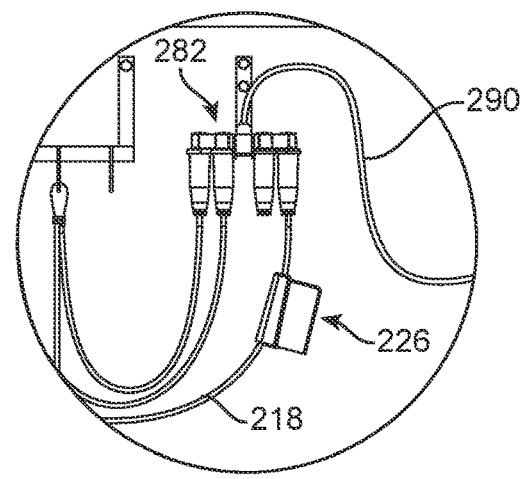
FIG. 4 is a detail view of the expandable member shown in FIG. 3.

An example of a system in which an embodiment pressure transducer 214 could be used is illustrated in FIGS. 3 and 4. A pump 201 is positioned within a pump chamber 200, and a pump outlet 202 is configured and arranged to direct fluid from the pump 201 out of the pump chamber 200. A low water float 209 and a high water float 210 could be used to assist in determining the fluid level within the pump chamber 200. The floats 209 and 210 are operatively connected to a manifold 282, and electrical wires 290 interconnect the manifold 282 and a control panel 206.

The pressure transducer 214 includes a reference side 215 and a pressure side 216, and a cable 218 extends from the reference side 215 as is well known in the art. The cable 218 includes a protective sleeve 219 through which electrical wires 220 and a vent tube 221 extend. Proximate the distal end of the cable 218, the vent tube 221 is operatively connected to an expandable member 226. As shown in FIGS. 10-13, a portion of the protective sleeve 219 is removed, the vent tube 221 is cut to form a first portion 222 and a second portion 223, and then a first vent tube connector 222a is operatively connected to the first portion 222 and a second connector vent tube 223a is operatively connected to the second portion 223. The expandable member 226 is then connected to the first and second vent tube connectors 222a and 223a. These components are preferably compression fit, with the first and second portions 222 and 223 being non-rigid and the first and second vent tube connectors 222a and 223a being rigid.

Figure 14:
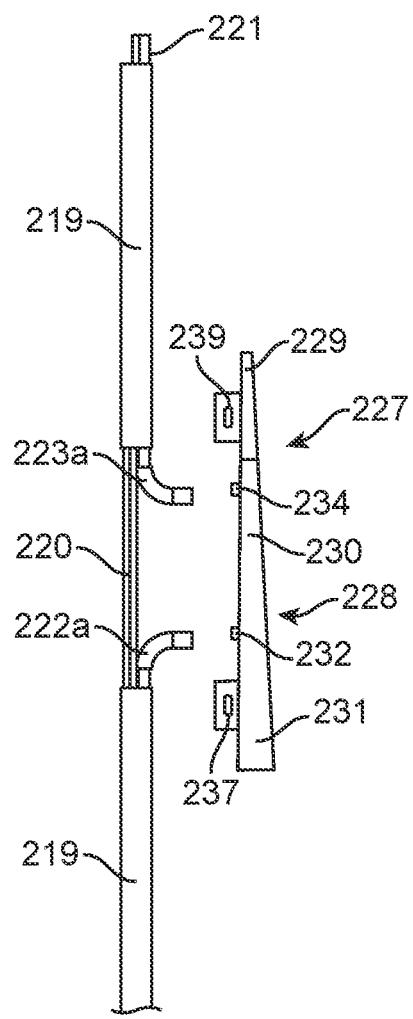
FIG. 14 is an exploded side view of the cable shown in FIG. 13 with a connector.
Figure 15:
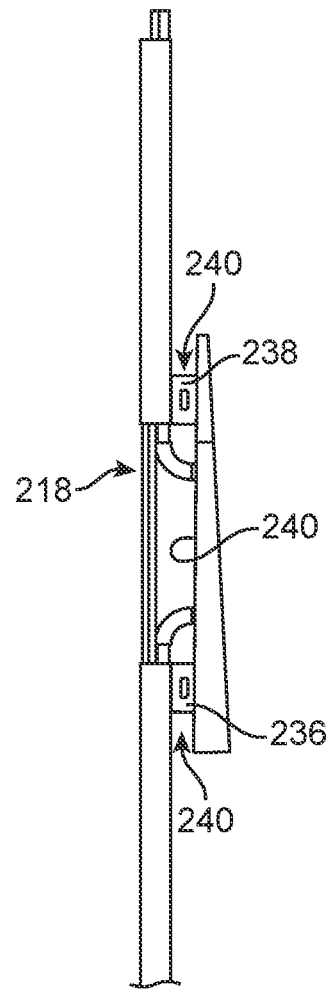
FIG. 15 is a side view of the cable shown in FIG. 13 connected to the connector shown in FIG. 14.
Figure 16:
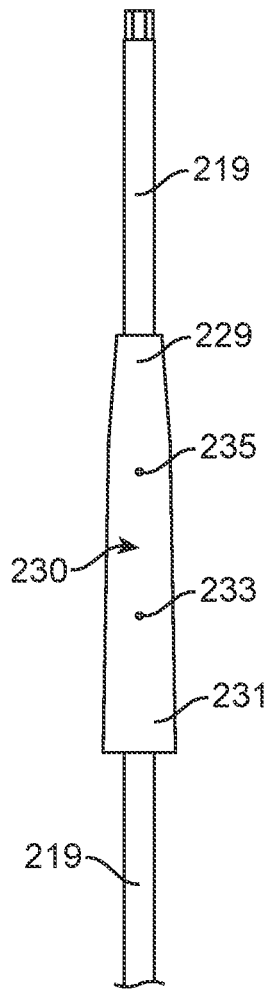
FIG. 16 is a rear view of the cable connected to the connector shown in FIG. 15.

The expandable member 226 includes a connector 227 and an expandable portion 242. As shown in FIGS. 14-16, first the connector 227 is connected to the vent tube 221. The connector 227 includes a base 228 having a top 229, an intermediate portion 230, and a bottom 231. From the side, the base 228 is generally wedge-shaped with the top 229 being narrower than the bottom 231. From the front and rear, the base 228 is generally rectangular with the top 229 slightly tapered inward relative to the bottom 231 and intermediate portion 230. The intermediate portion 230 includes a first portion connector 232 through which a first bore 233 extends from front to rear and a second portion connector 234 through which a second bore 235 extends from front to rear. A first spacer 236 extends outward from the base 228 between the first portion connector 232 and the bottom 231, and a second spacer 238 extends outward from the base 228 between the second portion connector 234 and the top 229. Optionally, the first and second spacers 236 and 238 includes apertures 237 and 239, respectively. If desired, a securing member such as a zip tie could be routed through the apertures 237 and 239 and secured about the cable to assist in holding the components in place during assembly. The vent tube connector 222a is operatively connected to the first portion connector 232, and the vent tube connector 223a is operatively connected to the second portion connector 234. These components are preferably compression fit, with the first and second vent tube connectors 222a and 223a being rigid and the first and second portion connectors 232 and 234 being semi-rigid. The first and second spacers 236 and 238 contact the sleeve 219 and provide gaps 240 between the base 228 and the cable 218.

Figure 17:
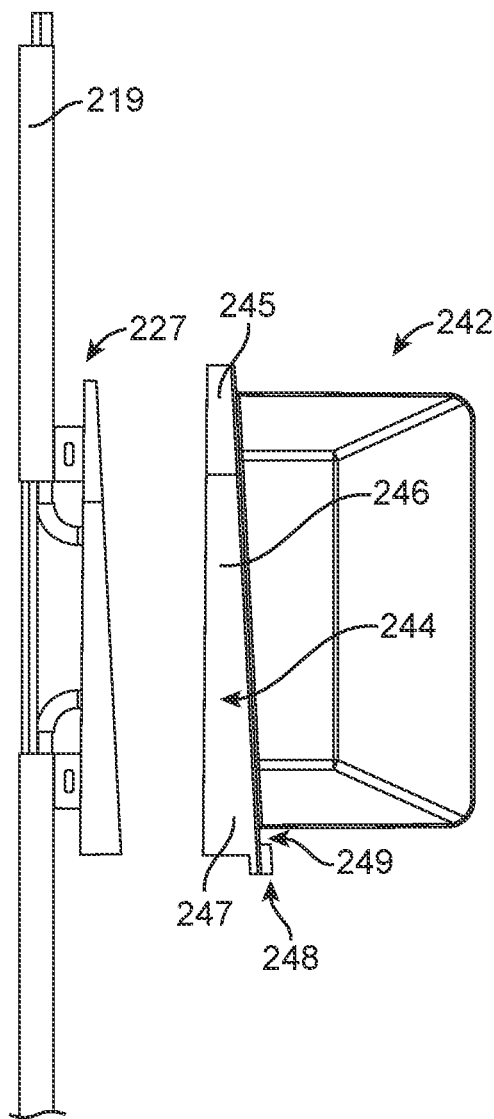
FIG. 17 is a partial exploded side view of the cable connected to the connector shown in FIG. 15 with an expandable portion.
Figure 18:
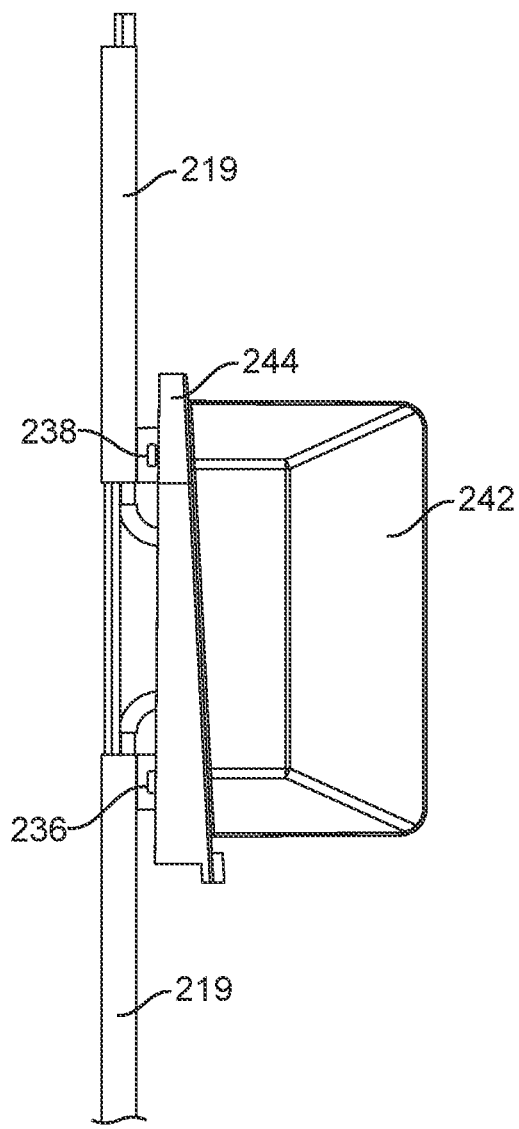
FIG. 18 is a side view of the cable connected to the connector and the connector connected to the expandable portion shown in FIG. 17.
Figure 19:
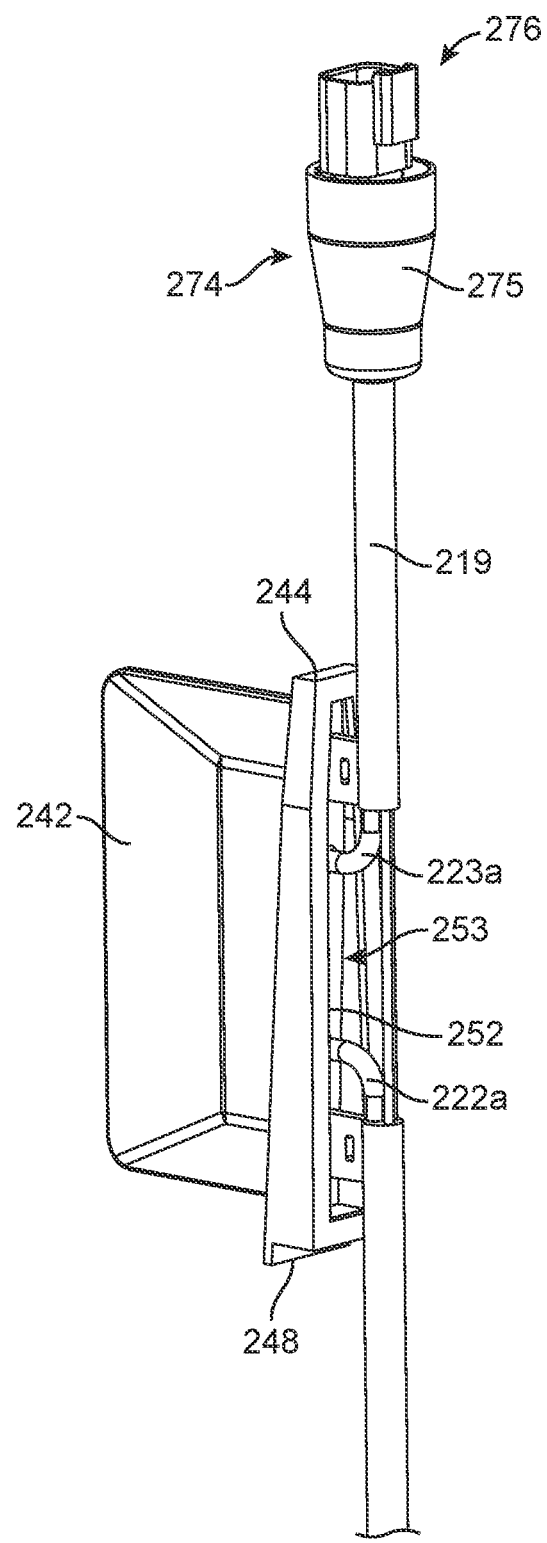
FIG. 19 is a perspective view of the cable, the connector, and the expandable portion shown in FIG. 18.

After the connector 227 is connected, the expandable portion 242 is connected to the connector 227, as shown in FIGS. 17-19. The expandable portion 242 is generally pan-shaped and forms a cavity 243. One side of the expandable portion includes a receiver 244 having a top 245, an intermediate portion 246, and a bottom 247 forming a cavity 253 and an opening 252 providing access to the cavity 253. The cavity 253 of the receiver 244 is configured and arranged to receive the connector 227. The bores 233 and 235 are in fluid communication with the cavity 243 of the expandable portion 242. A rear side of the bottom 247 includes a downward and rearward extending flange 248 with a protrusion 248a and forming a notch 249 between the flange 248 and the expandable portion 242.

Figure 20:
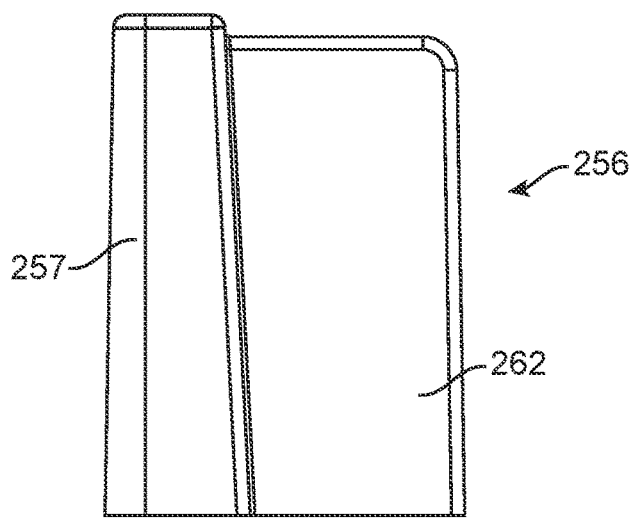
FIG. 20 is a partial exploded side view of the assembly shown in FIG. 18 with a housing.
Figure 21:
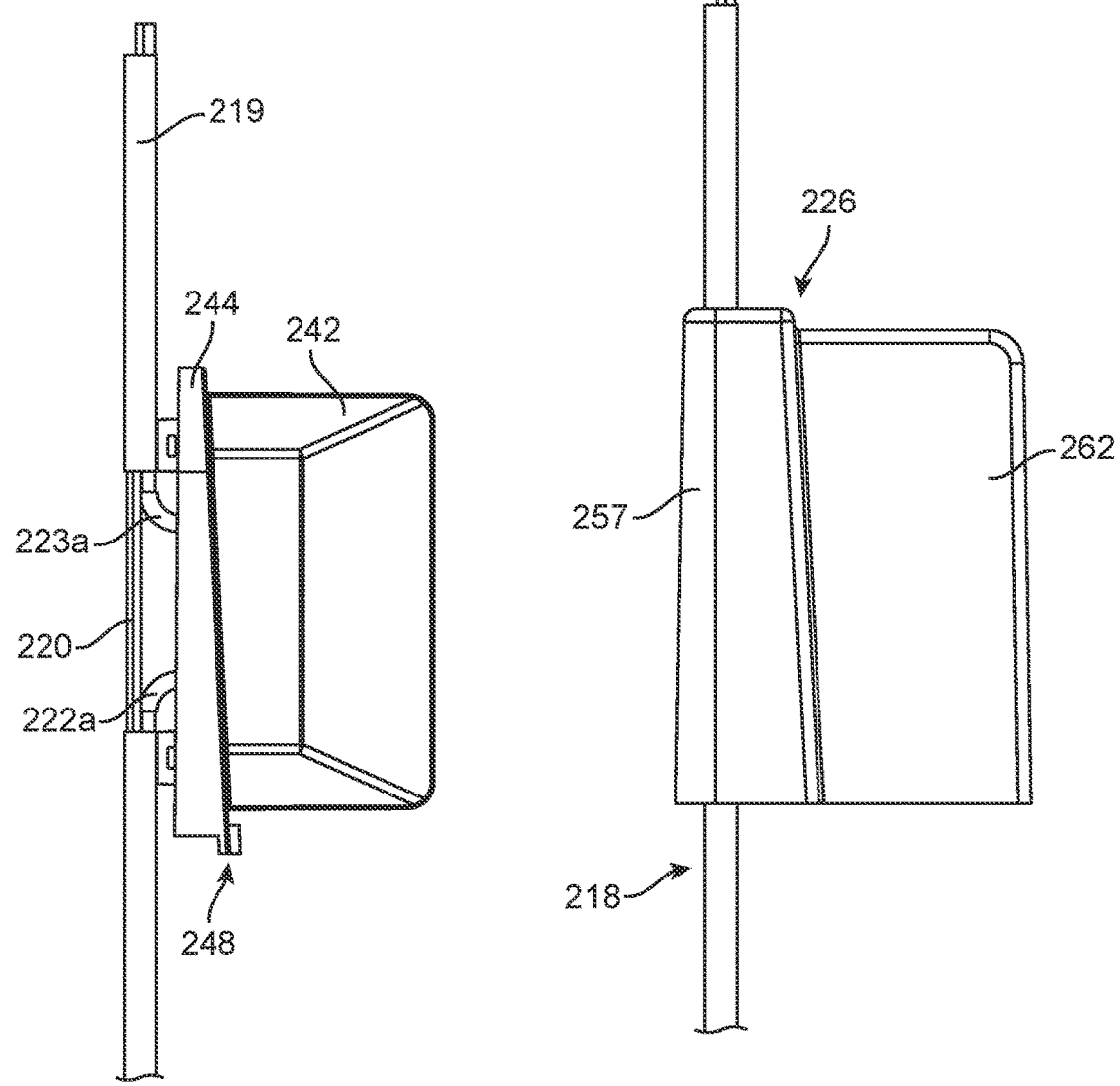
FIG. 21 is a side view of the assembly and the housing shown in FIG. 20 connected.
Figure 22:
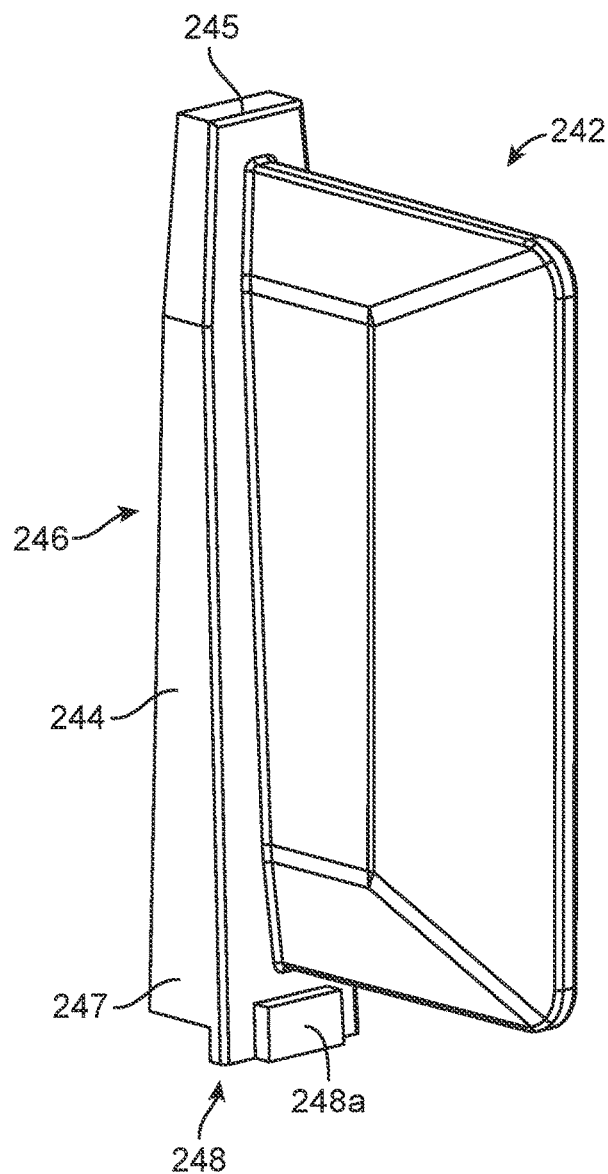
FIG. 22 is a rear perspective view of the expandable portion shown in FIG. 17.
Figure 23:
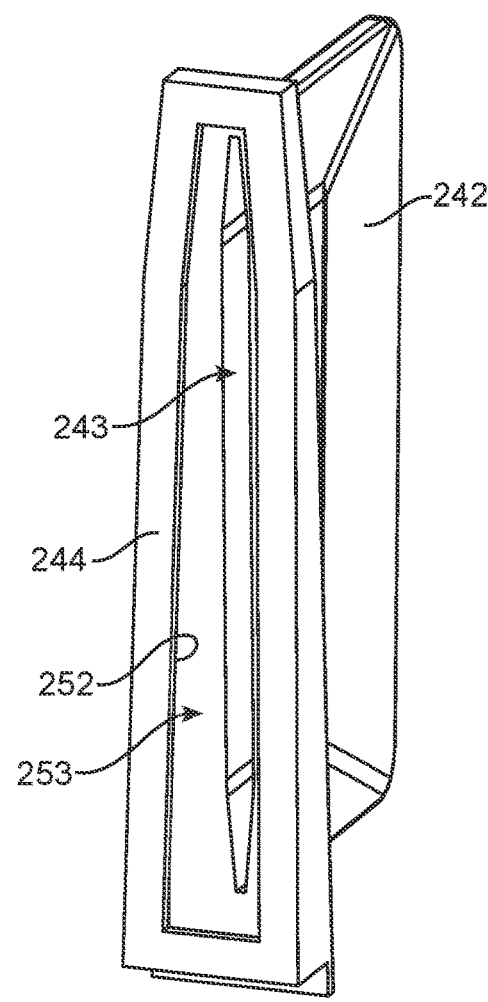
FIG. 23 is a front perspective view of the expandable portion shown in FIG. 17.
Figure 24A:
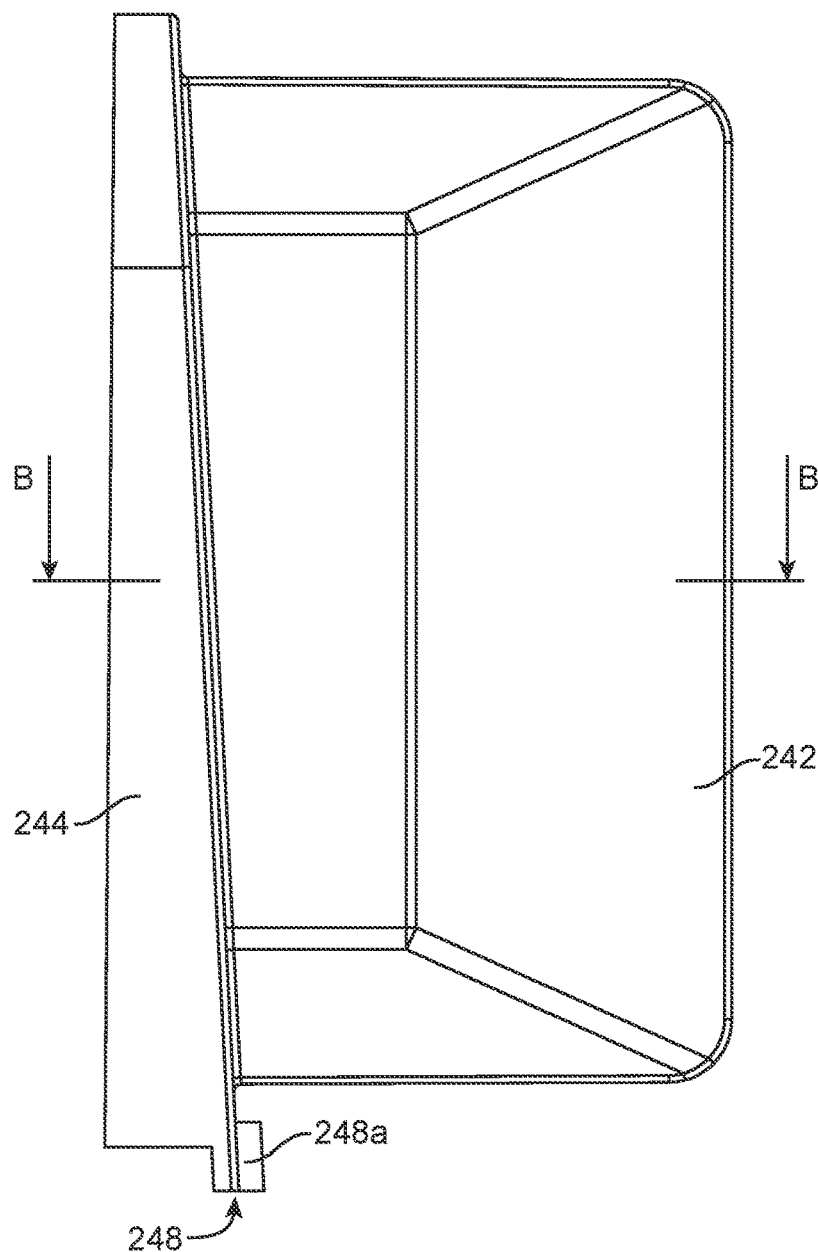
FIG. 24A is a side view of the expandable portion shown in FIG. 17.
Figure 24B:
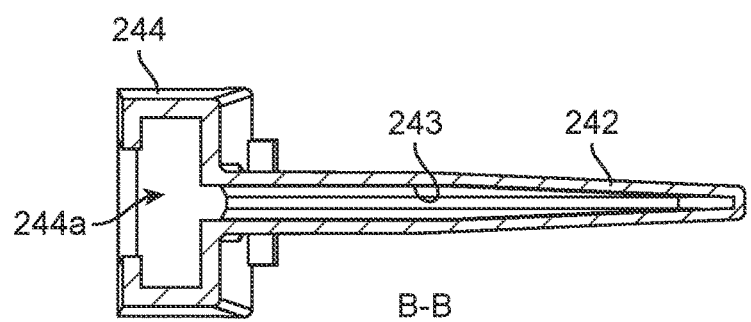
FIG. 24B is a cross-section view of the expandable portion taken along the lines 24B-24B in FIG. 24A.

Then, as shown in FIGS. 20 and 21, a housing 256 is positioned over a portion of the cable 218, the connector 227 positioned within the receiver 244, and the expandable portion 242. The housing 256 includes a cable receiving portion 257 and an expandable portion receiving portion 262. The cable receiving portion 257 includes a top 258, an intermediate portion 259, and a bottom 260 forming a channel 261 configured and arranged to receive a portion of the cable 218, the connector 227 positioned within the receiver 244. The expandable portion receiving portion 262 forms a cavity 263 configured and arranged to receive the expandable portion 242. Preferably, the housing 256 simply slides over these components. Once positioned, a sealant such as but not limited to epoxy is inserted within the spaces between the housing 256 and the components housed therein. The sealant protects the portion of the cable 218, the connector 227 positioned within the receiver 244, and the expandable portion 242 from moisture. The sealant protects an inside (cavity 243) of the expandable portion 242 from moisture exposure, but an outside of the expandable portion 242 is still exposed to moisture/the environment in the pump chamber. The assembly could be submersible in the fluid within the pump chamber. Then, a bottom portion 266 is connected to the bottom of the housing 256.

Figure 6A:
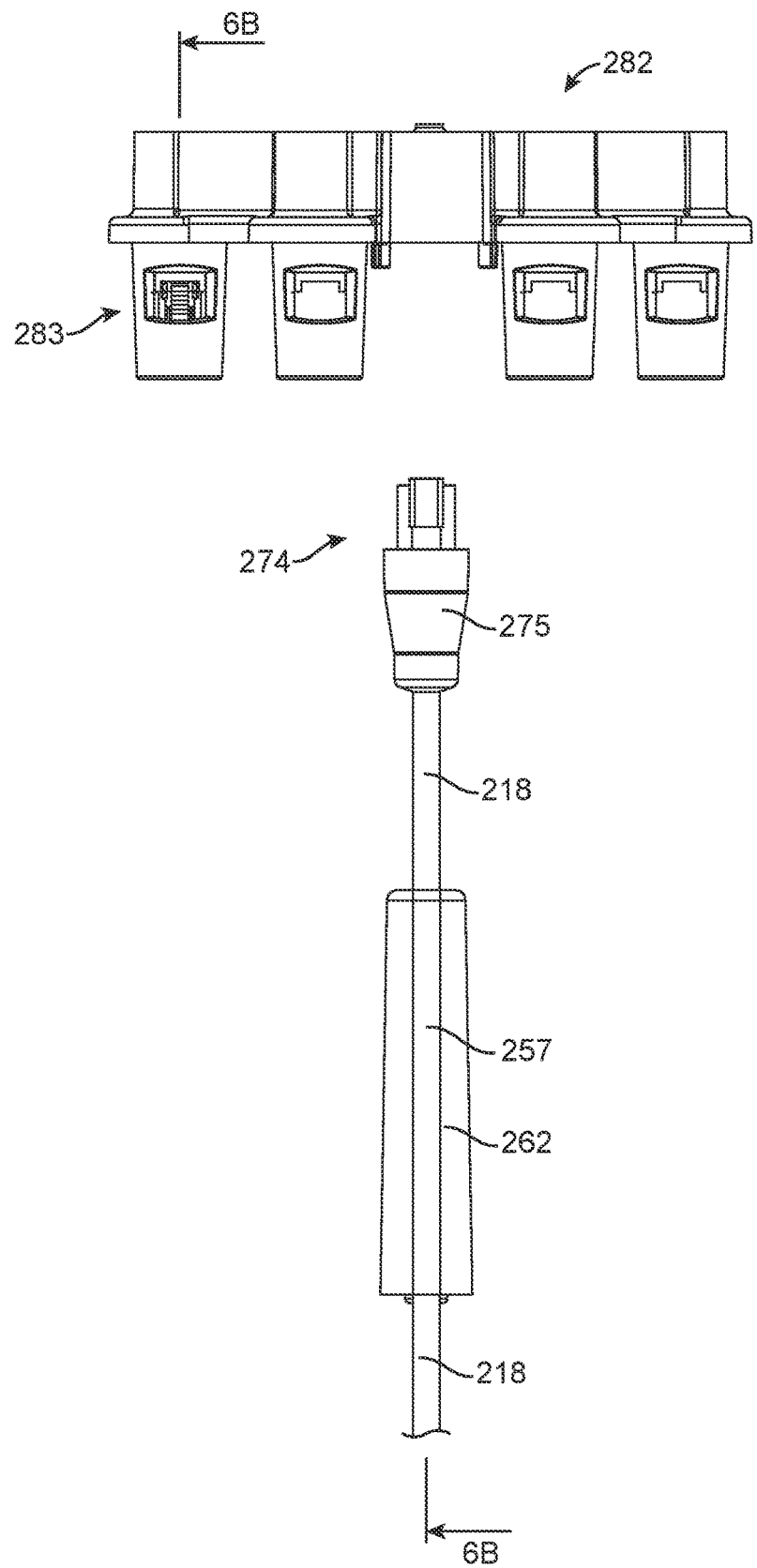
FIG. 6A is a side view of the cable interconnecting the expandable member and the vented connector shown in FIG. 5.

The bottom portion 266 is best seen in FIGS. 6B and 8B. The bottom portion 266 extends from a rear of the housing 256 toward the flange 248. A first extension 267 fits within the notch 249 and a second extension 268 extends below the flange 248 and upward proximate the front of the bottom 247. The first and second extensions 267 and 268 form a notch 269 configured and arranged to receive the flange 248.

The second portion 223 of the vent tube 221 extends from the housing 256 and is operatively connected to a vented connector 274, which is generally a quick-connect feature. The vented connector 274 includes a reinforced portion 275 from which a male connector portion 276 extends. The male connector portion 276 includes an electrical connection 277 (which could include multiple electrical connections) and an opening 278 to the vent tube 221. A release portion 279 extends upward from the male connector portion 276. The male connector portion 276 is configured and arranged to be received within a female connector portion 284 of a connector 283 (a vented connector connection member) of a manifold 282. The female connector portion 284 includes a mating electrical connection 285 and a release lever 287, and the female connector portion 284 blocks the opening 278 to the vent tube 221 thereby closing off the distal end of the vent tube 221. Should the installer wish to disconnect the male and female connector portions 276 and 284, the installer pushes the release lever 287 inward to contact the release portion 279 thereby pushing the male connector portion 276 downward out of the female connector portion's cavity. An electrical wire 290 extends from the manifold 282 to the control panel 206.

In operation, the installer receives the pressure transducer assembly, including the pressure transducer 214, the cable 218, the expandable member 226, and the vented connector 274; and the installer simply positions the pressure transducer 214 in the desired location within the chamber and plugs the vented connector 274 into the connector 283 of the manifold 282. The distal end of the vent tube 121 is then closed off, and should air within the vent tube 121 expand or contract, the expandable member 226 accommodates such changes.

Figure 5:
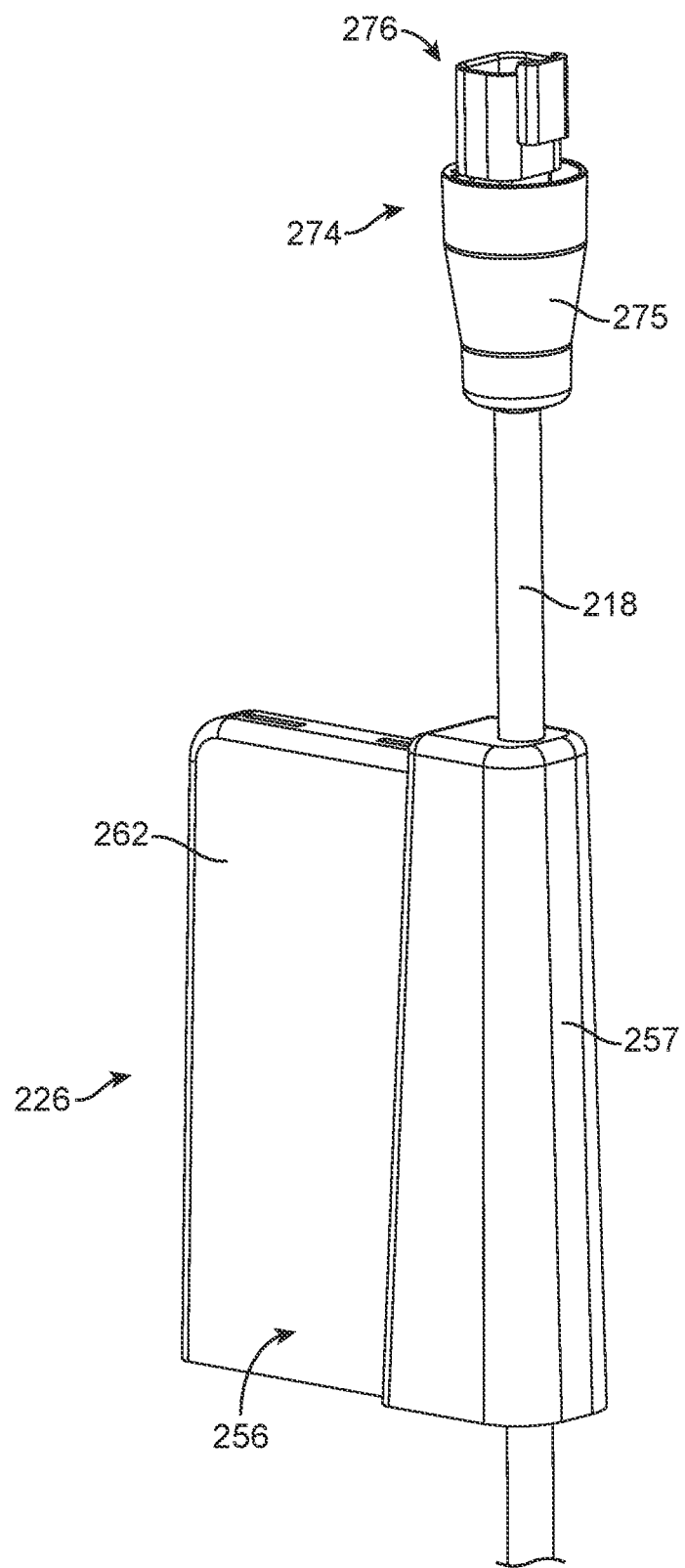
FIG. 5 is a perspective view of a cable interconnecting the expandable member and a vented connector of the system shown in FIG. 3.
Figure 8A:
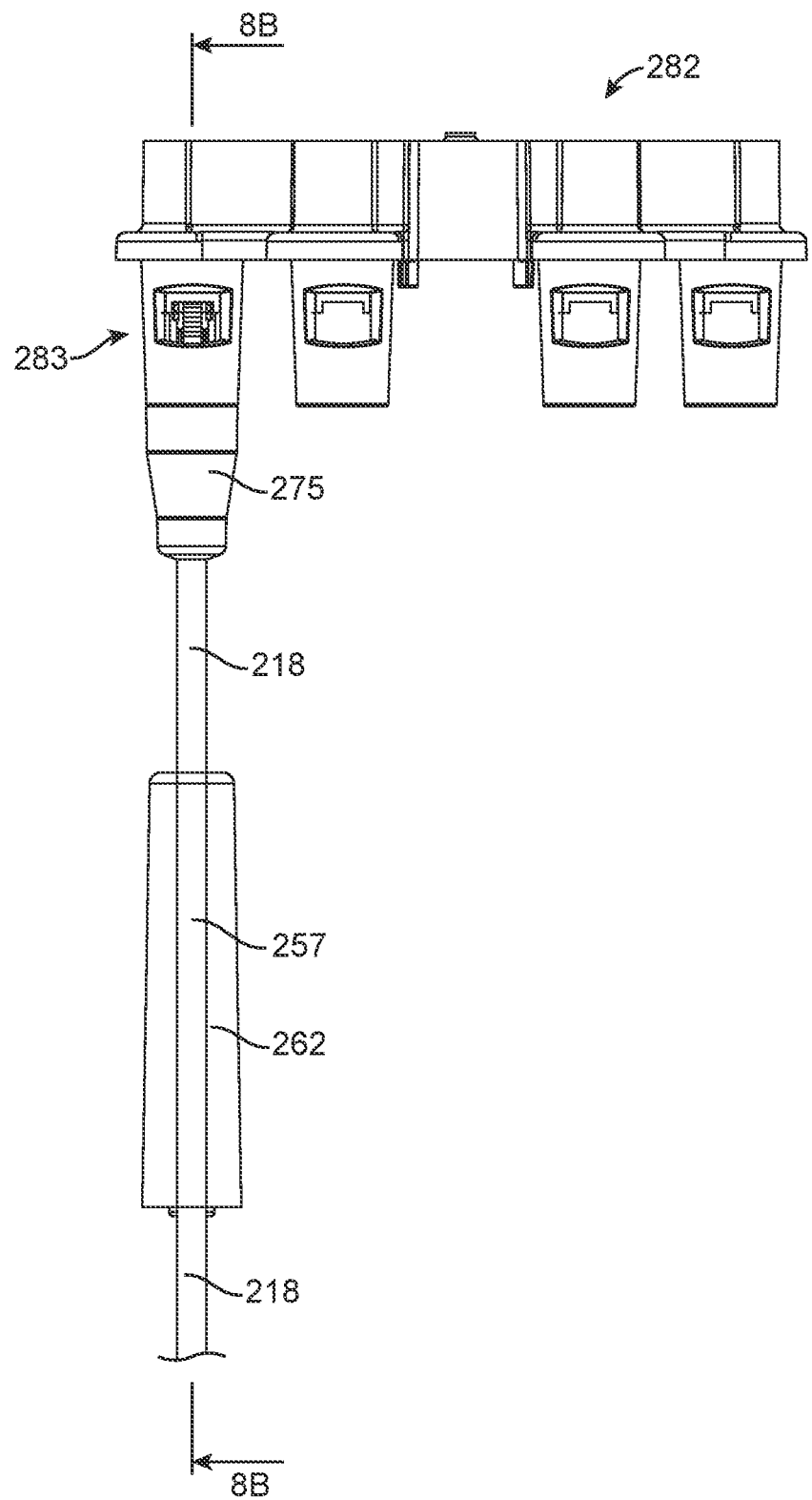
FIG. 8A is a side view of the cable interconnecting the expandable member and the vented connector, which is connected to a manifold connector shown in FIG. 5.
Figure 10:
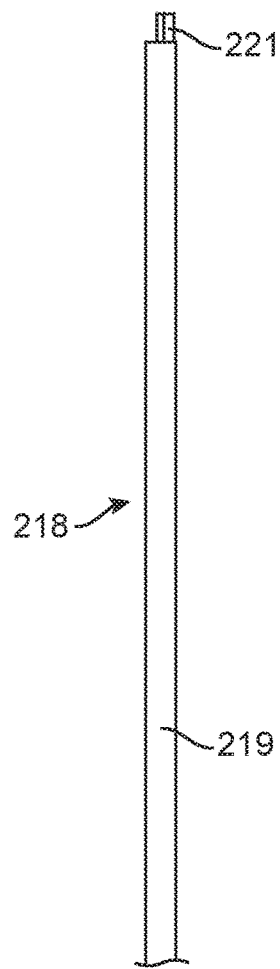
FIG. 10 is a side view of a cable for use with the system shown in FIG. 3.
Figure 11:
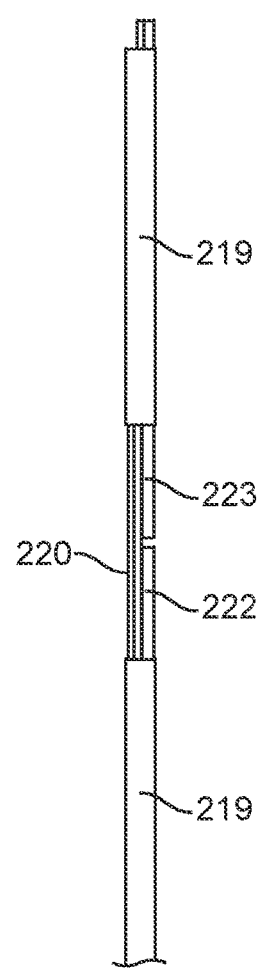
FIG. 11 is a side view of the cable shown in FIG. 10 with a portion of a sleeve removed.
Figure 12:
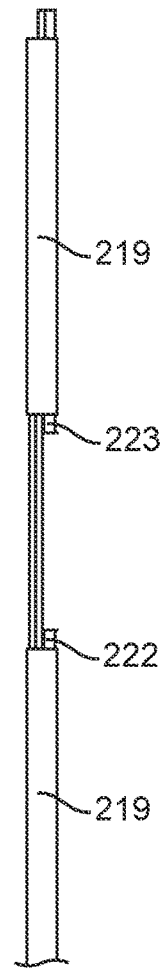
FIG. 12 is a side view of the cable shown in FIG. 11 with a portion of a vent tube removed.
Figure 13:
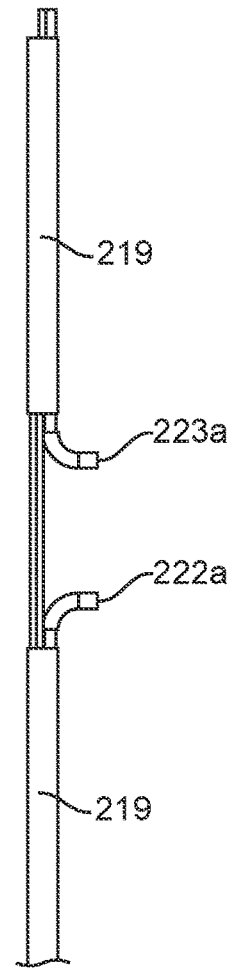
FIG. 13 is a side view of the cable shown in FIG. 12 with connectors operatively connected to the vent tube portions.

Because the vent tube 121 is open in its disconnected configuration (i.e., the male and female connector portions 276 and 284 are not connected, for example as shown in FIG. 5), changes in atmospheric conditions will not negatively affect the pressure transducer. When the vent tube 121 is closed in its connected configuration (i.e., the male and female connector portions 276 and 284 are connected, for example as shown in FIGS. 8A and 8B), the vent tube 121 is closed off so any changes in atmospheric conditions are accommodated by the expandable member 226. The expandable member 226 is flexible member, e.g., a "bladder", including walls that are configured and arranged to expand and contract to accommodate changes in volume of trapped air when it is trying to equalize to atmospheric conditions.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A pressure transducer assembly, comprising:
   a pressure transducer;
   a cable including a proximal end, a distal end, and a vent tube, the proximal end being operatively connected to the pressure transducer;
   an expandable member operatively connected to the vent tube proximate the distal end; and
   a vented connector operatively connected to the distal end, the vented connector configured and arranged to allow exposure of the vent tube to atmospheric conditions when in a disconnected configuration and to prevent exposure of the vent tube to atmospheric conditions when in a connected configuration, wherein the expandable member accommodates changes in air pressure within the vent tube when the vented connector is in the connected configuration.

2. The pressure transducer assembly of claim 1, wherein the cable includes electrical wire and a sleeve, the vent tube and the electrical wire being routed through the sleeve.

3. The pressure transducer assembly of claim 1, wherein the vent tube includes a first portion and a second portion proximate the distal end.

4. The pressure transducer assembly of claim 3, wherein the expandable member includes a vent tube connector and an expandable portion, the vent tube connector including a first portion connector with a first bore and a second portion connector with a second bore, the first portion connector configured and arranged to connect to the first portion of the vent tube and the second portion connector configured and arranged to connect to the second portion of the vent tube, the expandable portion having a cavity in fluid communication with the first and second bores thereby being in fluid communication with the first and second portions of the vent tube.

5. The pressure transducer assembly of claim 1, wherein the cable includes electrical wire and the vented connector includes an electrical connection and an opening, the electrical wire and the electrical connection being connected, the opening being in fluid communication with the vent tube.

6. The pressure transducer assembly of claim 5, wherein the vent tube extends at least partially through the opening.

7. The pressure transducer assembly of claim 5, further comprising a vented connector connection member including an electrical connection, the vented connector connection member configured and arranged to mate with the vented connector so that the electrical connections of the vented connector and the vented connector connection member connect, the vented connector connection member blocking the opening and thereby blocking the vent tube.

8. The pressure transducer assembly of claim 1, further comprising a housing enclosing the expandable member.

9. The pressure transducer assembly of claim 8, further comprising a sealant between the housing and the expandable member.

10. The pressure transducer assembly of claim 9, wherein the sealant protects an inside of the expandable member from exposure to moisture.

11. A method for assembling a pressure transducer assembly, comprising:
    providing a pressure transducer;
    providing a cable including a proximal end, a distal end, and a vent tube;
    providing an expandable member including a vent tube connector and an expandable portion, the vent tube connector including a first portion connector with a first bore and a second portion connector with a second bore, the expandable portion having a cavity in fluid communication with the first and second bores;
    providing a vented connector;
    connecting the proximal end to the pressure transducer;
    separating the vent tube into a first portion and a second portion proximate the distal end;
    connecting the first portion to the first portion connector and the second portion to the second portion connector, the vent tube being in fluid communication with the expandable portion; and
    connecting the distal end of the cable to the vented connector, the vented connector configured and arranged to allow exposure of the vent tube to atmospheric conditions when in a disconnected configuration and to prevent exposure of the vent tube to atmospheric conditions when in a connected configuration, wherein the expandable member accommodates changes in air pressure within the vent tube when the vented connector is in the connected configuration.

12. The method of claim 11, further comprising positioning a portion of the cable and the expandable member in a housing.

13. The method of claim 12, further comprising inserting a sealant between the portion of the cable and the expandable member and the housing.

14. The method of claim 11, further comprising providing a vented connector connection member configured and arranged to mate with the vented connector so that the vented connector connection member blocks the opening and thereby blocks the vent tube.

* * * * *